Figure 1:
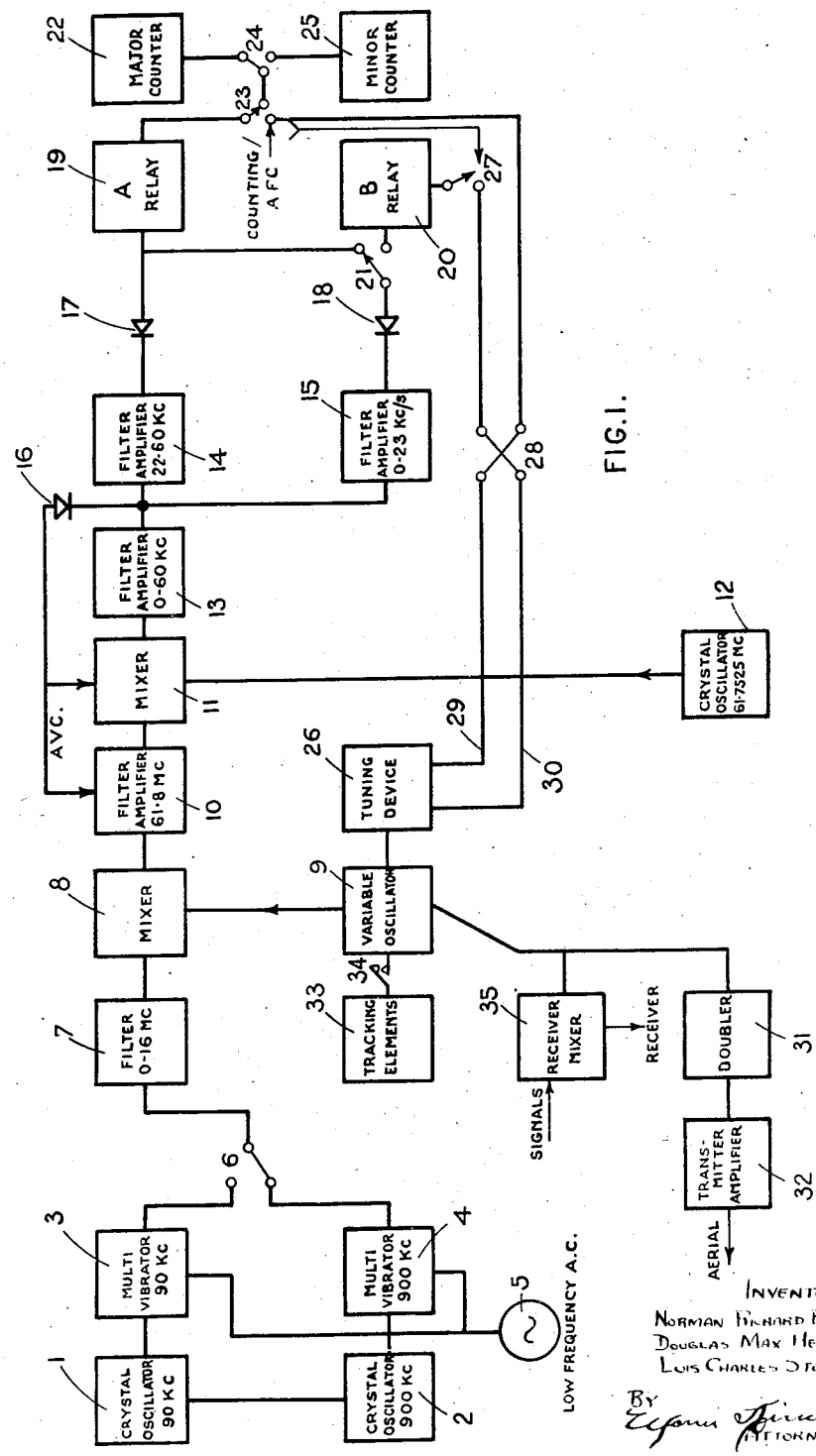

July 10, 1945.   N. R. BLIGH ET AL   2,380,288
MULTICHANNEL RADIO SIGNALING SYSTEM
Filed April 24, 1943   2 Sheets-Sheet 2

INVENTORS
NORMAN RICHARD BLIGH
DOUGLAS MAX HELLER AND
LUIS CHARLES STENNING

BY
ATTORNEY

Patented July 10, 1945

2,380,288

UNITED STATES PATENT OFFICE 2,380,288

MULTICHANNEL RADIO SIGNALING SYSTEM

Norman Richard Bligh, Harrow, Douglas Max Heller, Wembley, and Luis Charles Stenning, Ealing, London, England Application April 24, 1943, Serial No. 484,332
In Great Britain April 27, 1942

28 Claims. (Cl. 250—6)

This invention relates primarily to signaling systems of the kind comprising a plurality of radio transmitters and a plurality of superheterodyne radio receivers, wherein any two of the transmitters may be transmitting at the same time on different frequencies and yet each operator of a receiver, by adjusting appropriately the frequency of its local oscillator, can select the transmitter from which he will receive signals without actually receiving signals from that station. It will be assumed that all the frequencies on which the transmitters may operate lie within a range defined by a smaller frequency $F_L$ and a greater frequency $F_H$; but, since no limitation is placed on $F_L$ or $F_H$ (except that both are radio frequencies and that the former is less than the latter), no formal limitation is thereby imposed on the type; but it is desirable that the number of alternative frequencies within the range covering all of them should be as great as possible, and should approach the limit in which the space between any two consecutive frequencies is occupied wholly by the side bands of these frequencies by which the signals are conveyed. The invention relates also to apparatus adapted to form part of such signaling systems.

Systems of the kind specified differ from existing broadcasting systems (in which some of the receivers are always superheterodyne) in virtue of the words beginning "without." For broadcast receivers, if they are tuned with high accuracy, are tuned with reference to oscillations that are actually being transmitted; if the receivers are to be tuned accurately without reference to oscillations arising elsewhere, each transmitter-receiver pair must have access to, and be controlled by, a common standard of frequency. Again in broadcasting systems, each transmitter has a fixed frequency which is changed, if at all, only at long intervals and after long notice. In systems of the type specified it is usually desired that each transmitter should be able to change its frequency at any time after merely issuing a warning by its own signals. Then every transmitter and every receiver must have access to a common standard of every frequency on which transmission may take place. In the present state of affairs, these necessities restrict the utility of systems of the kind specified to conditions in which all the transmitters and all the receivers are closely controlled by a single authority, for example a military authority. But, in view of the simplification of such systems that is produced according to the present invention, it is possible that at some future time broadcasting systems will come within its ambit.

In existing systems of the kind specified the common standards of frequency are usually piezoelectric crystals. Each transmitter is supplied with a different crystal for each of the frequencies on which it may transmit, and each receiver with a different crystal for each of the frequencies that its local oscillator may be required to supply. There must then be prepared as many differently tuned crystals as there are transmitting frequencies and local oscillation frequencies, and, unless each transmitter is confined to a single frequency, each transmitter and each receiver will require several frequency standards; moreover, even if a transmitter and receiver are combined in a single station, there may be no diminution of the number of crystals required, because the local oscillator frequencies may all be different from any transmitter frequency.

The proposal of the present invention is broadly to derive all the different frequencies that are required, both for transmitting and for receiving, from different harmonics of a single standard frequency. Then each station whether it is a transmitter or receiver or both, will require only one standard oscillator and the frequency of this oscillator will be the same for all stations. All that is required therefore is a collection of similar standards, one for each station.

In multi-channel carrier telephony it is common practice to use, as the frequencies of the various channels, harmonics of a single fundamental frequency. But then each transmitter-receiver pair is permanently connected by a single channel; there is no question of the same pair's being adjusted at one time to operate on one frequency and at another on another frequency, or of the same receiver's being paired at one time with one transmitter and at another with another transmitter. The invention rests on the realisation that it is practically possible, and indeed convenient, to derive all the frequencies required from harmonics of a single fundamental even when any receiver and any transmitter may form a pair operating on any one of a set of different frequencies.

In view of this practice in carrier telephony, the scope of the invention has to be defined carefully. The utility of the invention is likely to increase with the number of transmitters and with the number of receivers in the system. But it would have some utility even if there were only one transmitter and only one receiver. It is necessary to exclude that possibility, but there is no reason to exclude any other, in particular that in which there is one transmitter (or receiver) and two receivers (or transmitters). Such a system would not be of the type specified; it is for this reason that the term "primarily" was inserted in the first sentence of this specification. The field of the invention must be extended to systems in which the transmitters and receivers together number at least 3 and include at least one transmitter and at least one receiver.

The simplest method in principle of carrying out the aforesaid proposal would be to use as the transmission frequencies all the harmonics $mf_0$ of the fundamental frequency $f_0$, for which the integer $m$ is not less than some value $m_L$ not greater than some greater value $m_H$, where $F_L = m_L f_0$ and $F_H = m_H f_0$; probably, instead of using the harmonic itself as a carrier, a variable oscillator, yielding the actual carrier, would be set to one of these harmonics. When the frequency $mf_0$ was to be received, the local oscillator would be set to $(m+n)f_0$ where $n$ is a positive or negative integer, small compared with $m$, so that $nf_0$ would be the intermediate frequency.

But this method is not likely to be the most convenient. In the first place it may often be convenient to "transform" the harmonics before they become the frequencies of transmitters or local oscillators. Thus they may be multiplied by an integral factor $\alpha$, e. g. doubled; they are then spaced at intervals $\alpha f_0$. Again they may all be shifted along the frequency spectrum by heterodyning with a constant frequency $f_1$. Since $f_1$ will then be at least as large as at least some of the harmonics, the stations will have to be provided with standards of $f_1$ as accurate as the standards of $f_0$. It would usually be possible to derive a suitable $f_1$ from $f_0$ by multiplication, but it will often be found more convenient to provide a second crystal as a standard oscillator. If many additional standards had to be provided, the proposal of the invention might lose any advantage over existing practice, but the position of two, or even three or four standards, instead of merely one, would not decrease the advantage appreciably, so long as all stations use the same standards.

Again if the frequency $f$ of an oscillator is to be controlled automatically by a standard frequency $f_s$, it is sometimes convenient to arrange matters so that $f$ assumes, not the value $f_s$, but a frequency from $f_s$ but a frequency differing from $f_s$ by some assigned difference D. If this plan is adopted, in apparatus according to the invention, D cannot conveniently be $f_0$ or any multiple thereof; for if it were, the multiple would still be tuned to one of the harmonics; accordingly a receiver must share with the transmitter a common standard, not only of $f_0$, but also of D; accordingly yet another standard will be required. However, if every $m$ is much greater than 1 and if D is less than $f_0$, each D will be small compared with every $f_s$, as is convenient on other grounds. Then exact agreement between the D's of a receiver and transmitter will not be necessary; sufficient agreement may be obtained if the D's are fixed by filters or other combinations of impedance elements which can be reproduced with considerable accuracy, though not with the accuracy of crystal resonators. Accordingly provision of the requisite "standard" of D will not involve any additional complexity.

In view of these considerations, the invention, in one aspect, may be stated thus.

According to the invention in a signaling system, comprising a set of radio transmitters and radio superheterodyne receivers such that the sum of the number of transmitters and the number of receivers exceeds 2 and there is at least one transmitter and one receiver, each said transmitter and each said receiver comprises (a) a standard oscillator having a fundamental natural frequency $f_0$, the same for all the said transmitters and all the said receivers, (b) means for generating from the said standard oscillator a plurality of oscillations having frequencies $mf_0$ ($m$ integral), (c) an oscillator whose frequency of oscillation $f$ is variable so as to cover the whole range $F_L$ to $F_H$ within which lie the plurality of frequencies on which the stations of the system may communicate, (d) means for establishing, at least approximately, a predetermined relation $R_0$ between the said frequency $f$ and any selected number of the said plurality $mf_0$, and (e) automatic means for maintaining that relation when once established.

Some comments on this statement will now be made. A signaling system does not cease to be in accordance with the invention merely because it contains, in addition to the said set, one or more transmitters or one or more receivers or both that do not comprise the said elements (a) to (e).

When it is part of a transmitter, the variable oscillator provides or directly controls the transmitted oscillations. If the signals are conveyed by frequency modulation, the variable oscillator may then be modulated. In that case, $f$ means the frequency of the oscillator when the modulation is zero.

When it is part of a receiver, the variable oscillator provides or directly controls the local oscillations.

The term "so as to cover" in clause (c) is to be interpreted to mean only that to each frequency in the range $F_L$ to $F_H$ there corresponds a possible frequency of the variable oscillator appropriate to its function in transmitting or receiving that frequency. $f$ need not be the same as that frequency. Thus, the frequency $f$ of the variable oscillator may be doubled before it provides or controls the transmitted or local oscillations. When this distinction between the frequency of the variable oscillator and the frequency of the oscillations it provides or controls is important, the symbol $f'$ will be used for the latter. It should be observed that, even if the oscillations of the variable oscillator are the local oscillations, when the oscillator is part of a receiver, $f$ may have to assume frequencies outside the range $F_L$ to $F_H$; for if the intermediate frequency is constant (as is preferable), the range of the frequency of the local oscillations will have to extend beyond the range of the transmitting frequencies at one end or the other.

The relation $R_0$ is preferably of the form $f = |F + D \pm mf_0|$, where F and D may both be positive or negative or zero; where D is less than $f_0$; and where F, if not zero, is greater than $f_0$. When $f$ is adjusted so that it bears the relation $R_0$ to $mf_0$, it will be said for brevity to be "set" to $mf_0$, and $f$ (or $f'$) will be called the frequency corresponding to $mf_0$. The relation of the said form may be produced by shifting the harmonics through the distance $f_1 = F$, as suggested above, and then combining them with $f$; but other methods are permissible and indeed preferable. For this reason F is represented by a symbol different from $f_1$; its use hereafter merely implies that the relation $R_0$ is of the said form and that $F$ is not zero.

The means (b) may, and usually will, generate harmonics of the standard frequency other than those in the said plurality $mf_0$. For that plurality is defined by clause (d) which requires that $f$ may be set to any $mf_0$. It is usually not desirable that $f$ should be set to the lowest harmonics; accordingly, even if the integers $m$ are consecutive (as is desirable), they will generally have a lower limit greater than 1. Of course they will always have an upper limit.

In the present state of the art no suitable standard oscillator other than a crystal oscillator is known; but if any other oscillator of at least equal stability were known, it might be equally suitable.

The means (d) cannot be wholly automatic; for the operator of a station must be able to choose at will which frequency he will transmit or receive. They may consist merely of a tuning dial, operating in the normal manner, associated with some tuning indicator that shows when the desired relation has been attained; but they may involve an automatic element whereby the operator chooses the desired frequency $mf_0$ and then leaves the apparatus to arrive at the predetermined relation to that frequency. On the other hand, the means (e) must require no attention from the operator. They will usually involve some device for compensating accidental departures from the relation $R_0$; but of course, if such accidental variations could be avoided, positive means (e) might not be necessary. If the means (d) do not secure the predetermined relation with the necessary accuracy, "maintaining" must include securing it with that accuracy.

These explanations of the meaning of terms in the foregoing statement apply equally to corresponding terms in the claims of this specification.

The manner of performing the invention will now be discussed. In selecting the frequency $f_0$ and the relation $R_0$, the following considerations are relevant. $f_0$ should be of the same order as the least permissible separation between transmitting frequencies; for it will be the difference between successive harmonics $f_0$. But if the frequencies of the harmonics, or the frequencies controlled by them, are multiplied, it may be correspondingly less; on the other hand, if (as will appear later) more than one transmitting frequency is associated with a single harmonic, $f_0$ may have to be correspondingly greater. The transmitted frequencies will be chosen with reference to the conditions in which it is desired to transmit, and will usually be very different from $f_0$.

Thus in one example it is required to provide 276 equally spaced transmitting frequencies in the range from about 125 to 150 mc./s. $f_0$ is then 90 kc./s.; the harmonics for which $m=10$ to 147 are selected; these are combined with a constant frequency $F=61.7525$ mc./s. to provide the transmitting frequencies, so that 138 frequencies are provided in the range 62.6525 to 74.9825 mc./s. The variable oscillators of the transmitters can be maintained at a frequency 22.5 kc. above or below any one of these frequencies, so that 276 frequencies in the range 62.630 to 75.005 mc./s. are provided for these oscillators. Finally the frequencies of the oscillators are doubled between the variable oscillator and the transmitter, so that the desired result is obtained. The intermediate frequency is always 4.86 mc./s., and the frequency of the local oscillator is greater than that of the signals; $2.43/0.09=27$ extra harmonics above $m=147$ are used to provide the necessary local oscillations when $m$ is greater than 120.

In a second example, it is required to provide 101 equally spaced transmitting frequencies in the range from about 10 to 15 mc./s. $f_0$ is then 50 kc./s. The harmonics for which $m=200$ to 300 are selected for the transmitting frequencies, and $F=0$. The variable oscillator can be maintained by a discriminator at 10 kc./s. above any harmonic. Consequently 101 frequencies in the range 10.01 to 15.01 mc./s. are available. The intermediate frequency is 0.8 mc./s. and the frequency of the local oscillator is greater than that of the signals; the extra $0.8/0.05=16$ harmonics above $m=300$ are used to provide the necessary local oscillations when $m$ is greater than 284.

One part of the function of means (d) is to select the particular harmonic $mf_0$ to which the frequency of the variable oscillator is to bear the predetermined relation. This part may be performed by calibrated tuning dials of the usual kind, designed to set a condenser or inductor in the tuning circuit of the oscillator to a particular value, and therefore its frequency to a value approaching the value of $f$ corresponding to $mf_0$ more closely than the value corresponding to $(m+1)f_0$ or $(m-1)f_0$. But such dial-controlled tuning circuits may become maladjusted, owing to thermal drift or the like, and may lead to the selection of the wrong harmonic. Some more positive method of setting is desirable; a method that depends on counting only has been found satisfactory. In describing the method, it will be assumed for simplicity that the relation $R_0$ is equality.

In this method the setting always starts by the selection of one particular harmonic, say $m_0f_0$. This will usually be the lowest or the highest of the harmonics that are to be used at all; if it is not sufficiently distinguished by its position in the series of harmonics, it can be distinguished by its amplitude or by being modulated in some characteristic manner; in the extreme, all other harmonics can be suppressed while it is being selected. Suppose that $m_0f_0$ is the lowest member of the series. Then a tuning dial varying $f$ is adjusted until a tuning indicator, forming part of or associated with means (e), indicates that $f$ is set to $m_0f_0$. The dial is then turned so as to increase $f$; when $f$ is set to $(m_0+1)f_0$ the indicator will indicate another coincidence. If the harmonic to be selected is $mf_0$ and $m=m_0+m'$, this process is continued until $(m'+1)$ coincidences have been indicated; it is then known that $f$ is set to $mf_0$.

If $m'$ is large this process is tedious; it can be abbreviated by counting in two or more stages. This matter is best explained by an example. Suppose that $m'=43$. Then in the first stage all those harmonics are suppressed for which $m'$ is not a multiple of 10, so that the only harmonics left are those for which $m=m_0$, $m_0+10$, $m_0+20$ . . . . Thus after 5 coincidences, including that with $m_0f_0$, $f$ is set to $(m_0+40)f_0$. The suppressed harmonics for which $m=m_0+41$, $m_0+42$ . . . are now restored; after 3 more coincidences $f$ will be set to $(m_0+43)f_0$. Accordingly 8 coincidences in all, instead of 44, have to be observed. The question then arises how some of the harmonics are to be suppressed in the first stage. The preferred method is to generate the frequencies in the first stage as the harmonics of a fundamental frequency $f_0'=10f_0$ provided by a subsidiary crystal oscillator; during the first stage the subsidiary crystal only is set into oscillation, during the second stage only the main crystal. The use of this device does not violate the principle underlying the invention, that all the frequencies required should be related to the harmonics of a single standard; for the first stage is only a preliminary adjustment; the final adjustment is made in the second stage and the harmonics concerned in it are those of the main crystal only.

The counting is preferably performed automatically, e. g. by applying an impulse to a telephone counter every time that a coincidence occurs.

In setting the variable oscillator only one harmonic, or at most a few adjacent harmonics, will be concerned at any one instant. It is then usually desirable, for various reasons that will be appreciated by experts, to eliminate as far as possible any influence of other harmonics. This can always be effected by placing immediately after the multivibrator, or other device in which the harmonics are generated, a variable filter ganged to the tuning circuit of the variable oscillator in such a manner that all harmonics are eliminated except those in the immediate neighbourhood of that harmonic to which the variable oscillator is being set at any moment. If the setting is effected by reducing to zero (or to D) the frequency of an oscillation issuing from a mixer to which are applied oscillations derived from the standard oscillator and from the variable oscillator, another method is to place a low pass filter immediately after the mixer. The unwanted harmonics can then be eliminated without the use of a ganged variable filter.

This second method can be adopted even when F is non-zero. For the oscillations of frequency $mf_0$, F, $f$ can be combined in a single mixer, or F can be mixed with $mf_0$ (or $f$), and the resultant mixed with $f$ (or $mf_0$). But if the predetermined relation is $f=|F+D\pm mf_0|$ and F is non-zero, another method is preferable for the following reason. It will almost always be necessary to amplify the oscillations issuing from the mixer or mixers. Mixers are apt to be the source of irregular low frequency disturbances (noise) arising, for instance, from mechanical disturbances. It is desirable to eliminate that noise before amplification or at least until the required oscillations have been raised far above any possible noise level. This elimination requires a filter that will not pass low frequencies, and would not be effected by the said low pass filter. In the preferred method, the harmonics $mf_0$ are combined with $f$, and the resultant, which includes $(f-mf_0)$, is passed through a fixed filter having a narrow pass range about F, which includes $F\pm D$. The oscillations passing the filter are amplified (the filter may itself be an amplifier), and combined in a second filter with those of frequency F; those having frequency near D selected by a low-pass filter. The filter passing $F+D$ excludes low-frequencies and therefore noise, until the oscillations have been raised above the noise level; and yet it is a fixed filter and requires no ganging. (In this account it has been assumed that the relation is $f=F+D+mf_0$ and that F is positive; the modifications necessary if this assumption is not true will be evident to the expert.)

The settings of the variable oscillators of a transmitter and of a receiver at the same station may be entirely independent; thus it may be required that a transmitter-receiver should transmit on one frequency and receive on another. But if transmission and reception at any time is always to be on the same frequency, there are certain advantages in a variable oscillator common to transmitter and receiver. It will have to be set to two frequencies, differing by the intermediate frequency, according as it is used for transmitting or receiving; but these settings may be associated. For this purpose (and also for other reasons) the intermediate frequency may be made independent of the frequency received, and it may be arranged that the $f$ appropriate to the variable oscillator when it is concerned in transmitting a frequency corresponding to $mf_0$ differs from the $f$ appropriate to the oscillator when it is concerned in receiving that frequency by a constant difference I, which may be the intermediate frequency or some multiple or sub-multiple of it. Then the known device of tracking circuits can be employed in means (d) for setting $f$ approximately. In all cases $f$ is set as if the variable oscillator were to be concerned in transmission (or alternatively in reception); and, if it is required to be concerned in reception (or transmission), tracking elements are switched in or out so as to cause $f$ to change by I. If $f$ is so high that distributed impedances are important, it may be preferable to modify this procedure by switching between two complete tuning circuits, of which one does and the other does not contain tracking elements, but which are otherwise similar. It is known that the difference in frequency introduced by tracking elements is not usually exactly independent of the frequency; but here exact independence is not required; for any small, but appreciable, departures from the predetermined relation, left after means (d) have operated, will be removed by means (e). For, however the change from transmission to reception is effected, $f$ must stand in a predetermined relation to some $mf_0$ in both states.

The settings of the variable oscillators of a transmitter and of a receiver at the same station may be related in another way. The setting of the transmitter may be controlled by the receiver or vice versa. Thus suppose it is desired to set a transmitter to transmit the frequency $f'$ corresponding to one of the harmonics. Then the receiving variable oscillator may be set so that the station receives $f'$ and the transmitter may be tuned, as a broadcast receiver would be tuned, to transmit the oscillation that its associated receiver is adapted to receive. In this case, of course, the variable oscillators of the transmitter and receiver must be separate. The converse method of setting the receiver is possible, but more difficult; for it would require very complete shielding of the receiver from its associated transmitter while signals from another station were being received.

Means (e) are preferably of the kind, mentioned heretofore, that set the frequency $f$ to a standard frequency $f_s$ by establishing a constant difference D between $f$ and $f_s$, and further of the species of this kind in which $f$ can be set so that the difference $f-f_s$ can be made either $+d$ or $-d$. For then two settings of $f$ are associated with each $f_s$ corresponding to a harmonic $mf_0$, and the number of different frequencies corresponding to a given number of harmonics is doubled.

The principle underlying such means is as follows. Oscillations of frequency $f$ are caused to beat with oscillations of frequency $f_s$ and the beat oscillations are applied to two filters, one of which passes only oscillations of frequency less than D and the other only oscillations of frequency greater than D. Those passed by the low-pass filter are applied to vary the tuning circuit of the variable oscillator so as to decrease $f$, and those passing the high-pass filter are applied to increase $f$. Then consideration will show that, so long as $f$ is originally not greater than $f_s+D$, it will assume the value $f_s-D$. If on the other hand, the oscillations passing the low-pass filter increase $f$ and those passing the high-pass filter decrease it, then, so long as $f$ is originally not less than $f_s-D$, it will assume the value $f_s+D$. Accordingly by interchanging the functions of oscillations passing the low-pass and high-pass filters, $f$ can be set to $f_s-D$, so long as it starts near enough to $f_s$.

In practice it is impossible to obtain filters with perfectly sharp cut-offs; accordingly the plan is modified by making the cut-off of the low-pass filter slightly greater than D and that of the high-pass filter slightly less than D, and by arranging that $f$ is not driven in either direction when oscillations are passing both filters. $f$ will then assume a value somewhere in the range, which can be made very narrow, over which the pass ranges of the filters overlap.

If there is not a single standard frequency $f_s$, but a series of equally spaced standards $mf_0$, with each of which the oscillations of frequency $f$ beat, then a further modification of the plan is necessary. It is convenient to make $$D = \tfrac{1}{4}\alpha f_0$$

For then the frequencies $(m-1)f_0-D$, $(m-1)f_0+D$, $mf_0-D$, $mf_0+D$, are also equally spaced. If the high-pass filter is replaced by a band-pass filter whose range is between 3D and a value just less than D, then if $f$ is originally in the range $mf_0+D$ to $mf_0+3D$, it will assume the value $mf_0-D$, in virtue of its beats with the standard $mf_0$, so long as oscillations passing the low pass filter decrease $f$. But, since $f$ will also beat with the standard $(m-1)f_0$, the part of the range of the band-pass filter between 3D and 2D is unnecessary; the same result will be attained, if its pass range is from just less than D to anything between 2D and 3D. Similarly, if the oscillations passing the low pass filter increase $f$, the filters being the same, $f$, if it starts between $mf_0-D$ and $mf_0+3D$, will assume the value $mf_0+D$.

If the predetermined relation is $f|F+D\pm mf_0|$, where F is non-zero, no substantial modification is required; for at some stage in producing this relation beats having frequencies near to D will be produced. Thus in the preferred method of setting to this relation, in which $f$ is first caused to beat with $mf_0$ and the resultant, after passing a filter, is caused to beat with F, the transmission of the filter will be chosen so that the frequencies resulting from the second beating, when $f$ is nearly set, have a frequency near D. If the setting is by automatic counting, some means, independent of those driven through the low-pass and high-pass filters, must be provided, and must operate until $f$ is nearly set to the desired harmonic; when that stage is reached, the drive controlled by the low- and high-pass filters is substituted. A "coincidence" for the purpose of counting must always be the appearance of beat oscillations that pass the high-pass filter (or alternatively the low-pass filter). But if the counting takes place in two stages as described above, a coincidence in the first stage (but not in the second) may be the appearance of beat oscillations that pass either of the two filters; for since the difference between successive standards will be much greater than D, beats having frequency as great as 2D or even 3D can arise at one time only from a single standard. Experts will realise that this extension of the range of a coincidence will enable $f$ to be driven more rapidly during the first stage.

Figure 2:
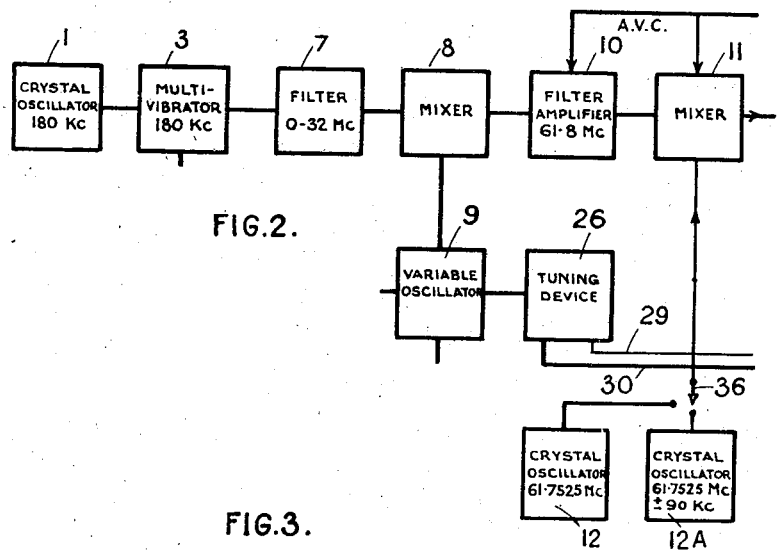
Figure 3:
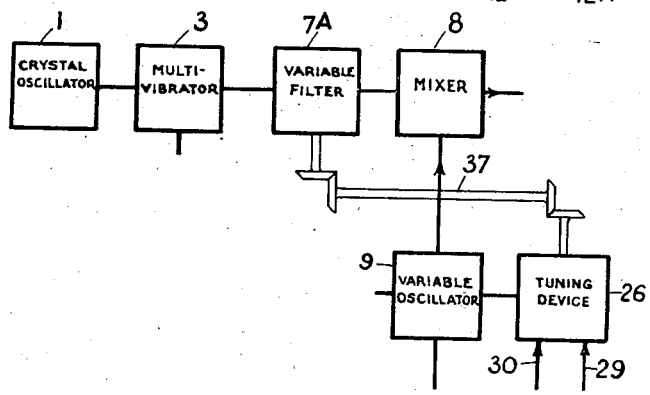

Certain embodiments of the invention will now be described, by way of example, with reference to the accompanying drawings, in which:

Figure 1 is a block diagram of a single transmitter-receiver station comprising all the aforesaid preferred features and operating according to the first of the two aforesaid examples, and Figures 2 and 3 show respectively two modifications of parts of the station equipment shown in Figure 1.

It must be understood that, as usual in block diagrams, the blocks denote function only and not construction; two separate blocks may contain a common part and conversely the parts of a single block may be widely separated in space.

In Figure 1, 1 is a crystal oscillator with the natural frequency $f_0=90$ kc./s.; it is the standard oscillator (a). 2 is a crystal oscillator with the natural frequency 900 kc./s.; it is the subsidiary standard for the first stage of the aforesaid two-stage counting. Each crystal oscillator drives a multi-vibrator 3 or 4, yielding a long series of harmonics. It is necessary that every harmonic within the range $m=10$ to 147 should be strong enough to be brought up to a useful level by the A. V. C. described later; but it is known that, owing to the finite width of the pulses, some harmonics of a multi-vibrator are usually undesirably weak. The device used to overcome this difficulty is known per se; it consists in applying to the multi-vibrator, from a source 5, low-frequency A. C. (e. g. 150 C. P. S.) so as to vary periodically the width of the pulses and therefore the position of those harmonics that are unduly weak. Switch 6 enables oscillations from either of the multi-vibrators to be applied to the rest of the arrangement, after passing the filter 7 which eliminates all harmonics higher than $m=(147+27)f_0=15.66$ mc./s.

In the mixer 8, oscillations from the multivibrator 3 or 4 are combined with oscillations from the variable oscillator 9. The output of mixer 8 is applied to a filter-amplifier 10, having a narrow pass range 1 mc./s. wide centred on 61.8 mc./s. and giving a gain of some 20 db. The output from 10 is combined in the mixer 11 with oscillations of frequency $F=61.7525$ mc./s. from the crystal oscillator 12. The output from mixer 11 passes first through the low-pass filter 13, cutting off above 60 kc./s.; its function is to eliminate the resultants of those harmonics, adjacent to that to which the variable oscillator is set at any moment, which are not excluded by the filter-amplifier 10. Filter 13 is succeeded by the filters 14, 15, which are those referred to, in the description of the preferred form of means (e), as low-pass and high-pass filters; their pass ranges are respectively 0–23 and 22–60 kc./s. Since it is desirable that the output of these filters should have approximately the same level whichever harmonic $mf_0$ is concerned, A. V. C. control of the usual kind is applied by the path 16 from the output of these filters to the filter 13.

The outputs of filters 14, 15 are rectified respectively by the rectifiers 17, 18 and, after rectification, pass through the coils of the relays 19, 20. During the first stage of counting, when the oscillator 2 is operative, the outputs of both rectifiers 17, 18 are applied to relay 19 by means of switch 21; this relay operates the "major" counter 22 through the switches 23, 24 and advances the reading by 900 kc./s. at each passage of current through the rectifiers. When the required reading on the major counter has been obtained, the switches 6, 21, 24 are thrown; oscillator 1 is brought into action; relay 20 is inoperative, but relay 19 operates the "minor" counter 25 and advances the reading by 90 kc./s. at each passage of current through the rectifier 17.

During the counting, the frequency of the oscillator 9 is varied by means of a variable condenser forming part of its tuning circuit and included in the tuning device 26. This condenser is driven by means not shown, for example by hand. It is first set in a position such that $F < f < 10f_0 + F$; in spite of the instability of tuning circuits there is no difficulty in securing that this condition is satisfied. The switches are set in the position shown, and the condenser driven so as to increase $f$. The first "coincidence," and the first passage of current through the rectifiers 17, 18, occurs when $f$ is nearly $10f_0 + F$; further coincidences occur at $20f_0 + F$, etc. When the major counter shows that the member of this series next below the selected member $mf_0$, to which $f$ is to be set, has been reached, the switches 6, 21, 24 are thrown, and counting is continued on the minor counter till the required reading is reached.

Means (d) has now operated so as to fulfill approximately the relation $R_0$. Means (e) are now brought into operation by throwing the switches 23, 27. These connect the outputs of the relays 19, 20 through the reversing key 28 to the clutch and reversing gear of a motor (not shown) included in the device 26, in such a manner that the motor drives the tuning condenser in one direction or the other according as current reaches the device 26 through the path 29 or the path 30, and so that the condenser is not driven at all if current arrives by both paths. Then, as explained heretofore, $f$ takes up and maintains a value about 0.0225 mc./s. from $mf_0 + F$, and on one side of it or the other according to the position of the reversing switch 28.

If the apparatus is being set as a transmitter, the output of the variable oscillator is applied through the frequency doubler 31 to the amplifier 32 from which the aerial is fed. If it is being set as a receiver, the tracking elements 33 are switched in to the tuning circuit of the variable oscillator by the switch 34; $f$ is thereby increased by about 2.43 mc./s. and $m$ for the harmonic of the oscillator 1 whose resultant with $f$ passes the filter 10 is increased by 27; but the oscillations issuing from that filter are unchanged and the latter part of the circuit will operate as before to maintain $f$ in the relation $R_0$ to the harmonic $(m+27)f_0$.

35 is the mixer in which local oscillations derived from the variable oscillator are mixed with the incoming signals. These signals will have the frequency $2(mf_0 + F \pm D)$, while $f$ is $$(m+27)f_0 + F \pm D$$

A doubler similar to 31 might be inserted between the variable oscillator and the mixer 35; but, since a mixer always produces the second harmonic of the local oscillation, no doubler is required; the selection from the output of the mixer of the resultant $54f_0 = 4.86$ mc./s., rather than of $$2(mf_0 + F \pm D) = \{(m+27)f_0 + F \pm D\}$$

is effected, of course, by the intermediate frequency amplifier.

Some of the many possible modifications of this embodiment will now be mentioned briefly, by way of example.

First, the counting may be made much more automatic by the use of the technique of automatic telephone exchanges. Thus the currents issuing from the rectifiers 17, 18 may pulse a "uniselector" which carries out all the necessary operations, driving the tuning device and stopping it when a position, set by the operator before the counting begins, is reached.

Second, in order to make the control of the tuning device more sensitive, the motor driving a condenser may be supplemented by a valve-operated variable reactor of known kind. The use of a "mechanical" reactor, involving a moving element, is probably always necessary in order to obtain the necessary range of control; but such reactors are necessarily somewhat sluggish compared with valve-operated reactors; a combination of reactors of both types would have the advantages of both types and the disadvantages of neither. The valve-operated reactor would, of course, be controlled by grid-bias, which might be taken directly from the outputs of rectifiers 17, 18.

Thirdly, the number of set frequencies $f$ (two in the said embodiment) that may correspond to a single harmonic $mf_0$ may be increased by the provision of alternative crystals 12 tuned to slightly different frequencies all within a range $f_0$. The number of extra frequencies thus obtainable is limited only by the disadvantage of providing additional standards and the inutility of providing set frequencies $f'$ spaced at distances so small that the modulation side-bands overlap. But there is one form of this proposal which in some circumstances might have considerable value.

Suppose that the embodiment shown in Figure 1 is modified as shown in Figure 2, where $f_0$ is increased to 180 kc./s. and an additional crystal 12A is provided having a natural frequency $F_1$, differing from $F = 61.7525$ mc./s. by 90 kc., the oscillators 12 and 12A being alternatively selectable by a switch 36. If $f$ is to be set to a frequency $m \times 90$ kc./s., where $m$ is even, the crystal of frequency F is used; if $f$ is to be set to $m \times 90$ kc./s., where $m$ is odd, the crystal of frequency $F_1$ is used. (There would be no need to change the filter-amplifier 10, for its pass-range will inevitably exceed 90 kc./s. considerably.) In either case D might now be doubled, since $f$ would be doubled. Greater latitude would therefore be permissible in the range within which means (d) must bring $f$, in order that means (e) may be able to set it accurately.

Figure 3 shows the alternative means, hereinbefore mentioned, for eliminating the influence of harmonics derived from the crystal oscillator 1 other than those immediately concerned at any one instant, by placing immediately after the multi-vibrator /3 a variable filter 7A ganged by an operative connection 37 to the tuning device 26 of the variable oscillator 9.

The proposal underlying the invention cannot be stated except with reference to a system comprising at least two stations of which at least one contains a transmitter and the other a receiver suitable for receiving signals from that transmitter.

But once systems according to the invention have been conceived, a single transmitter or receiver or transmitter-receiver (i. e. combination of a transmitter and receiver) suitable for use at a single station in such system becomes a vendible article identifiable by an expert. In order to be suitable, it must contain a standard oscillator, generating harmonics, and a variable oscillator that can be set to different harmonics; but no condition need be imposed on the natural frequency $f_0$ of the standard oscillator. For if the $f_0$ characteristic of the article is not that characteristic of any system according to the invention yet established, there may be still a possibility that such a system characterised by that $f_0$ might be established.

We claim:

1. A signaling system in which a receiver can be set to receive signals from a selected transmitter without actually receiving signals from such transmitter, said system comprising a group of at least three radio stations, each consisting of a transmitter, a superheterodyne receiver, or both, and said system including at least one transmitter and one such receiver; each transmitter and receiver comprising a standard oscillator having a fundamental natural frequency $f_0$ which is the same for all transmitters and receivers, means for generating from the fixed frequency oscillations emitted by the standard oscillator a plurality of oscillations having frequencies $mf_0$ where $m$ is an integral number, an oscillator whose frequency of oscillation $f$ is variable and able to cover the range $F_L$ to $F_H$ within which lie a plurality of frequencies on which the transmitters and receivers of the system may communicate, means for establishing, at least approximately, a predetermined relationship $R_0$ between the frequency $f$ and any selected frequency of the plurality $mf_0$, and automatic means for maintaining that relation when once established.

2. A signaling system in which a receiver can be set to receive signals from a selected transmitter without actually receiving signals from such transmitter, said system comprising a group of at least three radio stations, each consisting of a transmitter, a superheterodyne receiver, or both, and said system including at least one transmitter and one such receiver; each transmitter and receiver comprising a standard oscillator having a fundamental natural frequency $f_0$ which is the same for all transmitters and receivers, means for generating from the fixed frequency oscillations emitted by the standard oscillator a plurality of oscillations having frequencies $mf_0$ where $m$ is an integral number, an oscillator whose frequency of oscillation $f$ is variable and able to cover the range $F_L$ to $F_H$ within which lie a plurality of frequencies on which the transmitters and receivers of the system may communicate, means for establishing, at least approximately, a predetermined relationship $R_0$ between the frequency $f$ and any selected frequency of the plurality $mf_0$, and automatic means for accurately obtaining said relation and maintaining the same when once established.

3. A signaling system in which a receiver can be set to receive signals from a selected transmitter without actually receiving signals from such transmitter, said system comprising a group of at least three radio stations, each consisting of a transmitter, a superheterodyne receiver, or both, and said system including at least one transmitter and one such receiver; each transmitter and receiver comprising a standard oscillator having a fundamental natural frequency $f_0$ which is the same for all transmitters and receivers, means for generating from the fixed frequency oscillations emitted by the standard oscillator a plurality of oscillations having frequencies $mf_0$ where $m$ is an integral number, an oscillator whose frequency of oscillation $f$ is variable and able to cover the range $F_L$ to $F_H$ within which lie a plurality of frequencies on which the transmitters and receivers of the system may communicate, means to vary the frequency of oscillation of said variable oscillator, means to determine, at least approximately, when a predetermined relation $R_0$ is established between the frequency $f$ and any selected member of the plurality $mf_0$, and automatic means for maintaining that relation when once established.

4. A signaling system in which a receiver can be set to receive signals from a selected transmitter without actually receiving signals from such transmitter, said system comprising a group of at least three radio stations, each consisting of a transmitter, a superheterodyne receiver, or both, and said system including at least one transmitter and one such receiver; each transmitter and receiver comprising a standard oscillator having a fundamental natural frequency $f_0$ which is the same for all transmitters and receivers, means for generating from the fixed frequency oscillations emitted by the standard oscillator a plurality of oscillations having frequencies $mf_0$ where $m$ is an integral number, an oscillator whose frequency of oscillation $f$ is variable and able to cover the range $F_L$ to $F_H$ within which lie a plurality of frequencies on which the transmitters and receivers of the system may communicate, means to vary the frequency of oscillation of said variable oscillator, means to determine, at least approximately, when a predetermined relation $R_0$ is established between the frequency $f$ and any selected member of the plurality $mf_0$, and automatic means for accurately obtaining said relation and maintaining the same when once established.

5. A signaling system in which a receiver can be set to receive signals from a selected transmitter without actually receiving signals from such transmitter, said system comprising a group of at least three radio stations, each consisting of a transmitter, a superheterodyne receiver, or both, and said system including at least one transmitter and one such receiver; each transmitter and receiver comprising a standard oscillator having a fundamental natural frequency $f_0$ which is the same for all transmitters and receivers, means for generating from the fixed frequency oscillation emitted by the standard oscillator a plurality of oscillations having frequencies $mf_0$ where the integers $m$ form an arithmetical series, an oscillator whose frequency of oscillation $f$ is variable and able to cover the range $F_L$ to $F_H$ within which lie a plurality of frequencies on which the transmitters and receivers of the system may communicate, means to vary the frequency of oscillation of said variable oscillator, means to determine, at least approximately, when a predetermined relation $R_0$ is established between the frequency $f$ and any selected member of the plurality $mf_0$, and automatic means for maintaining that relation when once established.

6. A signaling system in which a receiver can be set to receive signals from a selected transmitter without actually receiving signals from such transmitter, said system comprising a group of at least three radio stations, each consisting of a transmitter, a superheterodyne receiver, or both, and said system including at least one transmitter and one such receiver; each transmitter and receiver comprising a standard oscillator having a fundamental natural frequency $f_0$ which is the same for all transmitters and receivers, means for generating from the fixed frequency oscillation emitted by the standard oscillator a plurality of oscillations having frequencies $mf_0$ where the integers $m$ form an arithmetical series whose constant difference is 1, an oscillator whose frequency of oscillation $f$ is variable and able to cover the range $F_L$ to $F_H$ within which lie a plurality of frequencies on which the transmitters and receivers of the system may communicate, means to vary the frequency of oscillation of said variable oscillator, means to determine, at least approximately, when a predetermined relation $R_0$ is established between the frequency $f$ and any selected member of the plurality $mf_0$, and automatic means for maintaining that relation when once established.

7. A signaling system in which a receiver can be set to receive signals from a selected transmitter without actually receiving signals from such transmitter, said system comprising a group of at least three radio stations, each consisting of a transmitter, a superheterodyne receiver, or both, and said system including at least one transmitter and one such receiver; each transmitter and receiver comprising a standard oscillator having a fundamental natural frequency $f_0$ which is the same for all transmitters and receivers, means for generating from the fixed frequency oscillation emitted by the standard oscillator a plurality of oscillations having frequencies $mf_0$ where the integers $m$ form an arithmetical series whose constant difference is $\alpha$, an oscillator whose frequency of oscillation $f$ is variable and able to cover the range $F_L$ to $F_H$ within which lie a plurality of frequencies on which the transmitters and receivers of the system may communicate, means to vary the frequency of oscillation of said variable oscillator, means to determine, at least approximately, when a predetermined relation $R_0$ is established between the frequency $f$ and any selected member of the plurality $mf_0$ such that $f=|F+D\pm mf_0|$ where $F$ and $D$ may both be positive, negative or zero, $|D|$ is less than $\alpha f_0$ and $|F|$, if not zero, is greater than $\alpha f_0$, and automatic means for maintaining that relation when once established.

8. Radio station equipment suitable for use in a system such as specified in claim 3, and comprising a standard oscillator having a fundamental natural frequency $f_0$, means for generating from the fixed frequency oscillations emitted by the standard oscillator a plurality of oscillations having frequencies $mf_0$ where $m$ is an integral number, an oscillator whose frequency of oscillation $f$ is variable and able to cover the range $F_L$ to $F_H$ within which lie a plurality of frequencies on which the station is required to communicate, means to vary the frequency of oscillation of said variable oscillator, means to determine, at least approximately, when a predetermined relation $R_0$ is established between the frequency $f$ and any selected member of the plurality $mf_0$, and automatic means for maintaining that relation when once established.

9. Radio station equipment suitable for use in a system such as specified in claim 7, and comprising a standard oscillator having a fundamental natural frequency $f_0$, means for generating from the fixed frequency oscillations emitted by the standard oscillator a plurality of oscillations having frequencies $mf_0$ where the integers $m$ form an arithmetical series whose constant difference is $\alpha$, an oscillator whose frequency of oscillation $f$ is variable and able to cover the range $F_L$ to $F_H$ within which lie a plurality of frequencies on which the station is required to communicate, means to vary the frequency of oscillation of said oscillator, means to determine, at least approximately, when a predetermined relation $R_0$ is established between the frequency $f$ and any selected member of the plurality in $f_0$ such that $f=|F+D\pm mf_0|$ where $F$ and $D$ may both be positive, negative or zero, $|D|$ is less than $\alpha f_0$ and $|F|$, if not zero, is greater than $\alpha f_0$, and automatic means for maintaining that relation when once established.

10. Radio station equipment suitable for use in a system such as specified in claim 5, and comprising a standard oscillator having a fundamental natural frequency of $f_0$, means for generating from the fixed frequency oscillations emitted by the standard oscillator a plurality of oscillations having frequencies $mf_0$ where integers $m$ form an arithmetical series with constant difference $\alpha$, an oscillator whose frequency of oscillation $f$ is variable and able to cover the range $F_L$ to $F_H$ within which lie a plurality of frequencies on which the station is required to communicate, means to vary the frequency of oscillation of said variable oscillator, means to determine, at least approximately, when a predetermined relation $R_0$ is established between the frequency $f$ and any selected member of the plurality $mf_0$, and automatic means for maintaining that relation when once established, said frequency relation determining means comprising means for setting the frequency $f$ successively to each of said frequencies substantially $mf_0$ in one of the forward and reverse orders of $m$, means for counting the number of times that $f$ is set to successive members of the group of frequencies $mf_0$, and means for arresting said successive settings when a predetermined member of said frequencies has been reached.

11. Radio station equipment suitable for use in a system such as specified in claim 5, and comprising a standard oscillator having a fundamental natural frequency of $f_0$, means for generating from the fixed frequency oscillations emitted by the standard oscillator a plurality of oscillations having frequencies $mf_0$ where integers $m$ form an arithmetical series with constant difference $\alpha$, an oscillator whose frequency of oscillation $f$ is variable and able to cover the range $F_L$ to $F_H$ within which lie a plurality of frequencies on which the station is required to communicate, means to vary the frequency of oscillation of said variable oscillator, means to determine, at least approximately, when a predetermined relation $R_0$ is established between the frequency $f$ and any selected member of the plurality $mf_0$, and automatic means for maintaining that relation when once established, said frequency relation determining means comprising means for setting the frequency $f$ successively to each of a group of frequencies substantially $nmf_0$ in one of the forward and reverse orders of $m$ where $n$ is a fixed integer greater than 1, means for counting the number of times that $f$ is set to successive members of the group of frequencies $nmf_0$, means operable, when in the course of said successive settings a predetermined member of said group $nmf_0$ has been reached, for setting the frequency $f$ successively to each of the frequencies substantially $mf_0$ in one of the forward and reverse orders of $m$ starting from a member of $mf_0$ which is within the range determined by the members immediately adjacent to said predetermined member of the group $nmf_0$, means for counting the number of times that $f$ is set to successive members of the group of frequencies $mf_0$, and means for arresting the last said successive settings when a predetermined member of said frequencies $mf_0$ has been reached.

12. Radio station equipment suitable for use in a system such as specified in claim 5, and comprising a standard oscillator having a fundamental natural frequency of $f_0$, means for generating from the fixed frequency oscillations emitted by the standard oscillator a plurality of oscillations having frequencies $mf_0$ where integers $m$ form an arithmetical series with constant difference $\alpha$, an oscillator whose frequency of oscillation $f$ is variable and able to cover the range $F_L$ to $F_H$ within which lie a plurality of frequencies on which the station is required to communicate, means to vary the frequency of oscillation of said variable oscillator, means to determine, at least approximately, when a predetermined relation $R_0$ is established between the frequency $f$ and any selected member of the plurality $mf_0$, and automatic means for maintaining that relation when once established, said frequency relation determining means comprising means for setting the frequency $f$ successively to each of a group of frequencies substantially 10 $mf_0$ in one of the forward and reverse orders of $m$, means for counting the number of times that $f$ is set to successive members of the group of frequencies 10 $mf_0$, means operable, when in the course of said successive settings a predetermined member of said group 10 $mf_0$ has been reached, for setting the frequency $f$ successively to each of the frequencies substantially $mf_0$ in one of the forward and reverse orders of $m$ starting from a member of $mf_0$ which is within the range determined by the members immediately adjacent to said predetermined member of the group 10 $mf_0$, means for counting the number of times that $f$ is set to successive members of the group of frequencies $mf_0$, and means for arresting the last said successive settings when a predetermined member of said frequencies $mf_0$ has been reached.

13. Radio station equipment suitable for use in a system such as specified in claim 5, and comprising a standard oscillator having a fundamental natural frequency $f_0$, means for generating from the fixed frequency oscillations emitted by the standard oscillator a plurality of oscillations having frequencies $mf_0$ where integers $m$ form an arithmetical series with constant difference $\alpha$, a second standard oscillator having a fundamental natural frequency $nf_0$ where $n$ is a fixed integer greater than 1, means for generating from the fixed frequency oscillations emitted by the second standard oscillator a plurality of oscillations having frequencies $mf_0$, an oscillator whose frequency of oscillation $f$ is variable and able to cover the range $F_L$ to $F_H$ within which lie a plurality of frequencies on which the station is required to communicate, means to vary the frequency of oscillation of said variable oscillator, means to determine, at least approximately, when a predetermined relation $R_0$ is established between the frequency $f$ and any selected member of the plurality $mf_0$, and automatic means for maintaining that relation when once established, said frequency relation determining means comprising means for setting the frequency $f$ successively to each of a group of frequencies substantially $nmf_0$ in one of the forward and reverse orders of $m$, means for counting the number of times that $f$ is set to successive members of the group of frequencies $nmf_0$, means operable, when in the course of said successive settings a predetermined member of said group $nmf_0$ has been reached, for setting the frequency $f$ successively to each of the frequencies substantially $mf_0$ in one of the forward and reverse orders of $m$ starting from a member of $mf_0$ which is within the range determined by the members immediately adjacent to said predetermined member of the group $nmf_0$, means for counting the number of times that $f$ is set to successive members of the group of frequencies $mf_0$, and means for arresting the last said successive settings when a predetermined member of said frequencies $mf_0$ has been reached.

14. Radio station equipment suitable for use in a system such as specified in claim 5, and comprising a standard oscillator having a fundamental natural frequency of $f_0$, means for generating from the fixed frequency oscillations emitted by the standard oscillator a plurality of oscillations having frequencies $mf_0$ where integers $m$ form an arithmetical series with constant difference $\alpha$, an oscillator whose frequency of oscillation $f$ is variable and able to cover the range $F_L$ to $F_H$ within which lie a plurality of frequencies on which the station is required to communicate, means to vary the frequency of oscillation of said variable oscillator, means to determine, at least approximately, when a predetermined relation $R_0$ is established between the frequency $f$ and any selected member of the plurality $mf_0$, and automatic means for maintaining that relation when once established, said frequency relation determining means comprising means for setting the frequency $f$ successively to each of said frequencies substantially $mf_0$ in one of the forward and reverse orders of $m$, automatic means for counting the number of times that $f$ is set to successive members of the group of frequencies $mf_0$, and means for arresting said successive settings when a predetermined member of said frequencies has been reached.

15. Radio station equipment suitable for use in a system such as specified in claim 5, and comprising a standard oscillator having a fundamental natural frequency of $f_0$, means for generating from the fixed frequency oscillations emitted by the standard oscillator a plurality of oscillations having frequencies $mf_0$ where integers $m$ form an arithmetical series with constant difference $\alpha$, an oscillator whose frequency of oscillation $f$ is variable and able to cover the range $F_L$ to $F_H$ within which lie a plurality of frequencies on which the station is required to communicate, means to vary the frequency of oscillation of said variable oscillator, means to determine, at least approximately, when a predetermined relation $R_0$ is established between the frequency $f$ and any selected member of the plurality $mf_0$, and automatic means for maintaining that relation when once established, said frequency relation determining means comprising means for setting the frequency $f$ successively to each of a group of frequencies substantially $nmf_0$ in one of the forward and reverse orders of $m$ where $n$ is a fixed integer greater than 1, automatic means or counting the number of times that $f$ is set to successive members of the group of frequencies $nmf_0$, means operable, when in the course of said successive settings a predetermined member of said group $nmf_0$ has been reached, for setting the frequency $f$ successively to each of the frequencies substantially $mf_0$ in one of the forward and reverse orders of $m$ starting from a member of $mf_0$ which is within the range determined by the members immediately adjacent to said predetermined member of the group $nmf_0$, automatic means for counting the number of times that $f$ is set to successive members of the group of frequencies $mf_0$, and means for arresting the last said successive settings when a predetermined member of said frequencies $mf_0$ has been reached.

16. Radio station equipment suitable for use in a system such as specified in claim 3, and comprising a standard oscillator having a fundamental natural frequency $f_0$, means for generating from the fixed frequency oscillations emitted by the standard oscillator a plurality of oscillations having frequencies $mf_0$ where $m$ is an integral number, an oscillator whose frequency of oscillation $f$ is variable and able to cover the range $F_L$ to $F_H$ within which lie a plurality of frequencies on which the station is required to communicate, means to vary the frequency of oscillation of said variable oscillator, means to determine, at least approximately, when a predetermined relation $R_0$ is established between the frequency $f$ and any selected member of the plurality $mf_0$, and automatic means for maintaining that relation when once established, said frequency relation determining means comprising an amplifier having its input connected to receive, during the setting of $f$ to a frequency $m_0f_0$, the said frequency $m_0f_0$, and a filter connected to prevent the access to at least part of said amplifier of those frequencies $mf_0$ for which $m$ differs from $m_0$ by more than an assigned limit.

17. Radio station equipment suitable for use in a system such as specified in claim 3, and comprising a standard oscillator having a fundamental natural frequency $f_0$, means for generating from the fixed frequency oscillations emitted by the standard oscillator a plurality of oscillations having frequencies $mf_0$ where $m$ is an integral number, an oscillator whose frequency of oscillation $f$ is variable and able to cover the range $F_L$ to $F_H$ within which lie a plurality of frequencies on which the station is required to communicate, means to vary the frequency of oscillation of said variable oscillator, means to determine, at least approximately, when a predetermined relation $R_0$ is established between the frequency $f$ and any selected member of the plurality $mf_0$, and automatic means for maintaining that relation when once established, said frequency relation determining means comprising an amplifier having its input connected to receive, during the setting of $f$ to a frequency $m_0f_0$, the resultant of the combination of the said frequency $m_0f_0$ with some other frequency, and a filter connected to prevent the access to at least part of said amplifier of said resultants for which $m$ differs from $m_0$ by more than an assigned limit.

18. Radio station equipment suitable for use in a system such as specified in claim 3, and comprising a standard oscillator having a fundamental natural frequency $f_0$, means for generating from the fixed frequency oscillations having frequencies $mf_0$ where $m$ is an integral number, an oscillator whose frequency of oscillation $f$ is variable and able to cover the range $F_L$ to $F_H$ within which lie a plurality of frequencies on which the station is required to communicate, means to vary the frequency of oscillation of said variable oscillator, means to determine, at least approximately, when a predetermined relation $R_0$ is established between the frequency $f$ and any selected member of the plurality $mf_0$, and automatic means for maintaining that relation when once established, said frequency relation determining means comprising an amplifier having its input connected to receive, during the setting of $f$ to a frequency $m_0f_0$, the said frequency $m_0f_0$, and a filter which immediately succeeds said means for generating the said frequencies $mf_0$, which has a variable pass range, and which is ganged to the means for varying $f$ in such a manner as to prevent the access to said amplifier of those frequencies $mf_0$ for which $m$ differs from $m_0$ by more than an assigned limit.

19. Radio station equipment suitable for use in a system such as specified in claim 3, and comprising a standard oscillator having a fundamental natural frequency $f_0$, means for generating from the fixed frequency oscillations having frequencies $mf_0$ where $m$ is an integral number, an oscillator whose frequency of oscillation $f$ is variable and able to cover the range $F_L$ to $F_H$ within which lie a plurality of frequencies on which the station is required to communicate, means to vary the frequency of oscillation of said variable oscillator, means to determine, at least approximately, when a predetermined relation $R_0$ is established between the frequency $f$ and any selected member of the plurality $mf_0$, and automatic means for maintaining that relation when once established, said frequency relation determining means comprising an amplifier having its input connected to receive, during the setting of $f$ to a frequency $m_0f_0$, the resultant of the combination of the said frequency $m_0f_0$ with some other frequency, and a filter which immediately succeeds said means for generating the said frequencies $mf_0$, which has a variable pass range, and which is ganged to the means for varying $f$ in order to prevent the access to said amplifier of said resultants for which $m$ differs from $m_0$ by more than an assigned limit.

20. Radio station equipment suitable for use in a system such as specified in claim 7, and comprising a standard oscillator having a fundamental natural frequency $f_0$, means for generating from the fixed frequency oscillations emitted by the standard oscillator a plurality of oscillations having frequencies $mf_0$ where the integers $m$ form an arithmetical series whose constant difference is $\alpha$, an oscillator whose frequency of oscillation $f$ is variable and able to cover the range $F_L$ to $F_H$ within which lie a plurality of frequencies on which the station is required to communicate, means to vary the frequency of oscillation of said oscillator, means to determine, at least approximately, when a predetermined relation $R_0$ is established between the frequency $f$ and any selected member of the plurality in $f_0$ such that $f=|F+D\pm mf_0|$ where $F$ and $D$ may both be positive, negative or zero, $|D|$ is less than $\alpha f_0$ and $|F|$, if not zero, is greater than $\alpha f_0$, and automatic means for maintaining that relation when once established, said frequency relation determinging means comprising a first mixer connected to combine the said oscillations of frequency $mf_0$ with the oscillations of frequency $f$, a second mixer connected to combine the resultant of such first mixing with the oscillations of frequency F, and amplifying and filtering means disposed between said first and second mixers and having a pass range about the frequency $F+D$.

21. A combination of a radio transmitter and a superheterodyne radio receiver suitable for use in a system such as specified in claim 3, and comprising a standard oscillator having a fundamental natural frequency $f_0$, means for generating from the fixed frequency oscillations emitted by the standard oscillator a plurality of oscillations having frequencies $mf_0$ where $m$ is an integral number, an oscillator whose frequency of oscillation $f$ is variable and able to cover the range $F_L$ to $F_H$ within which lie a plurality of frequencies on which the station is required to communicate, said variable oscillator serving in the transmitter as the source of the transmitted oscillation and in the receiver as the source of the local oscillations, means to vary the frequency of oscillation of said variable oscillator, means to determine, at least approximately, when a predetermined relation $R_0$ is established between the frequency $f$ and any selected member of the plurality $mf_0$, and automatic means for maintaining that relation when once established.

22. A combination of a radio transmitter and a superheterodyne radio receiver suitable for use in a system such as specified in claim 3, and comprising a standard oscillator having a fundamental natural frequency $f_0$, means for generating from the fixed frequency oscillations emitted by the standard oscillator a plurality of oscillations having frequencies $mf_0$ where $m$ is an integral number, an oscillator whose frequency of oscillation $f$ is variable and able to cover the range $F_L$ to $F_H$ within which lie a plurality of frequencies on which the station is required to communicate, said variable oscillator serving in the transmitter to control the transmitted oscillations and in the receiver as the source of the local oscillations, means to vary the frequency of oscillation of said variable oscillator, means to determine, at least approximately, when a predetermined relation $R_0$ is established between the frequency $f$ and any selected member of the plurality $mf_0$, and automatic means for maintaining that relation when once established.

23. A combination of a radio transmitter and a superheterodyne radio receiver suitable for use in a system such as specified in claim 3, and comprising a standard oscillator having a fundamental natural frequency $f_0$, means for generating from the fixed frequency oscillations emitted by the standard oscillator a plurality of oscillations having frequencies $mf_0$ where $m$ is an integral number, an oscillator whose frequency of oscillation $f$ is variable and able to cover the range $F_L$ to $F_H$ within which lie a plurality of frequencies on which the station is required to communicate, said variable oscillator having a tuning circuit comprising tracking elements by whose insertion or removal the variable oscillator can be changed from the state in which it is capable of forming part of the transmitter emitting a given frequency $f'$ to at least approximately the state in which it is capable of forming the local oscillator of the receiver receiving the said frequency $f'$ means to vary the frequency of oscillation of said variable oscillator, means to determine, at least approximately, when a predetermined relation $R_0$ is established between the frequency $f$ and any selected member of the plurality $mf_0$, and automatic means for maintaining that relation when once established.

24. A combination of a radio transmitter and a superheterodyne radio receiver suitable for use in a system such as specified in claim 3, and comprising a standard oscillator having a fundamental natural frequency $f_0$, means for generating from the fixed frequency oscillations emitted by the standard oscillator a plurality of oscillations having frequencies $mf_0$ where $m$ is an integral number, an oscillator whose frequency of oscillation $f$ is variable and able to cover the range $F_L$ to $F_H$ within which lie a plurality of frequencies on which the station is required to communicate, said variable oscillator having two complete tuning circuits one with and one without tracking elements but otherwise similar and means for substituting one for the other of said tuning circuits so as to change said variable oscillator from the state in which it is capable of forming part of the transmitter emitting a given frequency $f'$ to at least approximately the state in which it is capable of forming the local oscillator of the receiver receiving the said frequency $f'$, means to vary the frequency of oscillation of said variable oscillator, means to determine, at least approximately, when a predetermined relation $R_0$ is established between the frequency $f$ and any selected member of the plurality of $mf_0$, and automatic means for maintaining that relation when once established.

25. Radio station equipment suitable for use in a system such as specified in claim 7, and comprising a standard oscillator having a fundamental natural frequency $f_0$, means for generating from the fixed frequency oscillations emitted by the standard oscillator a plurality of oscillations having frequencies $mf_0$ where the integers $m$ form an arithmetical series whose constant difference is $\alpha$, an oscillator whose frequency of oscillation $f$ is variable and able to cover the range $F_L$ to $F_H$ within which lie a plurality of frequencies on which the station is required to communicate, means to vary the frequency of oscillation of said oscillator, means to determine, at least approximately, when a predetermined relation $R_0$ is established between the frequency $f$ and any selected member of the plurality in $f_0$ such that $f=|F+D\pm mf_0|$ where F and D may both be positive, negative or zero, $|D|$ is less than $\alpha f_0$ and $|F|$, if not zero, is greater than $\alpha f_0$, means controllable by an operator for making D alternatively $+\frac{1}{4}\alpha f_0$ and $-\frac{1}{4}\alpha f_0$, and automatic means for maintaining that relation when once established.

26. Radio station equipment suitable for use in a system such as specified in claim 7, and comprising a standard oscillator having a fundamental natural frequency $f_0$, means for generating from the fixed frequency oscillations emitted by the standard oscillator a plurality of oscillations having frequencies $mf_0$ where the integers $m$ form an arithmetical series whose constant difference is $\alpha$, an oscillator whose frequency of oscillation $f$ is variable and able to cover the range $F_L$ to $F_H$ within which lie a plurality of frequencies on which the station is required to communicate, means to vary the frequency of oscillation of said oscillator, means to determine, at least approximately, when a predetermined relation $R_0$ is established between the frequency $f$ and any selected member of the plurality in $f_0$ such that $f=|F+D\pm mf_0|$ where F and D may both be positive, negative or zero, $|D|$ is less than $\alpha f_0$ and $|F|$, if not zero, is greater than $\alpha f_0$, and automatic means for maintaining that relation when once established, said automatic means comprising a pair of filters the first of which passes only frequencies between substantially zero and a limit slightly greater than $\frac{1}{4} \alpha f_0$ and the second of which passes only frequencies between a limit slightly less than $\frac{1}{4} \alpha f_0$ and a limit lying between $\frac{1}{2} \alpha f_0$ and $\frac{3}{4} \alpha f_0$, means for causing oscillations passing said first filters to increase, or alternatively decrease, $f$ and for causing oscillations passing said second filter to decrease (or alternatively increase, $f$, and means controllable by the operator for choosing whether the oscillations passing said first filter shall increase $f$ and those passing said second filter shall decrease $f$ or vice versa.

27. Radio station equipment suitable for use in a system such as specified in claim 7, and comprising a standard oscillator having a fundamental natural frequency $f_0$, means for generating from the fixed frequency oscillations emitted by the standard oscillator a plurality of oscillations having frequencies $mf_0$, where integers $m$ form an arithmetical series with a constant difference $\alpha$, at least two additional standard oscillators of frequencies $F_1$, $F_2$ lying within a range not much greater than $\alpha f_0$, an oscillator whose frequency of oscillation $f$ is variable and able to cover the range $F_L$ to $F_H$ within which lie a plurality of frequencies on which the station is required to communicate, means to vary the frequency of oscillation of said variable oscillator, means to determine, at least approximately, when a predetermined relation $R_0$ is established between the frequency $f$ and any selected member of the plurality $mf_0$ such that $f=|F+D\pm mf_0|$ where $|D|$ is less than $\alpha f_0$ and is positive, negative or zero and $|F|$ is greater than $\alpha f_0$ and is positive or negative, control means operable for selecting the oscillations from either one of said additional standard oscillators for combination with the oscillations of frequency $mf_0$ and with the oscillations from said variable oscillator in the course of establishing said relation $R_0$, and automatic means for maintaining that relation when once established.

28. A combination of a radio transmitter and a superheterodyne radio receiver suitable for use in a system such as specified in claim 3, said receiver comprising a standard oscillator having a fundamental natural frequency $f_0$, means for generating from the fixed frequency oscillations emitted by the standard oscillator a plurality of oscillations having frequencies $mf_0$ where integers $m$ form an arithmetical series with constant difference $\alpha$, an oscillator whose frequency of oscillations $f$ is variable and able to cover the range $F_L$ to $F_H$ within which lie the plurality of frequencies on which the station is required to communicate, means to vary the frequency of oscillation of said variable oscillator, means to determine, at least approximately, when a predetermined relation $R_0$ is established between the frequency $f$ and any selected member of the plurality $mf_0$, automatic means for maintaining that relation when once established, said frequency relation determining means comprising means for setting the frequency $f$ successively to each of the frequencies $mf_0$ in one of the forward and reverse orders of $m$, means for counting the number of times that $f$ is set to successive members of the group of frequencies $mf_0$, and means for arresting said successive settings when a predetermined member of said frequencies has been reached, said transmitter having a variable oscillator separate from the said oscillator of the receiver, and means capable, after said receiver has been adjusted to receive a frequency $f'$, of adjusting the transmitter so as to transmit oscillations that the receiver is adapted to receive.

NORMAN RICHARD BLIGH.
DOUGLAS MAX HELLER.
LUIS CHARLES STENNING.